United States Patent
Huh et al.

(10) Patent No.: US 6,584,559 B1
(45) Date of Patent: Jun. 24, 2003

(54) FIRMWARE DOWNLOAD SCHEME FOR HIGH-AVAILABILITY SYSTEMS

(75) Inventors: Won Uk Huh, Thornton, CO (US); William C. Lyford, Longmont, CO (US); Kevin L. Stiles, Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/493,633

(22) Filed: Jan. 28, 2000

(51) Int. Cl.[7] ................................................ G06F 1/24
(52) U.S. Cl. .............................. 713/2; 713/1; 713/100
(58) Field of Search ............................... 713/1, 2, 100, 713/193; 714/36

(56) References Cited

U.S. PATENT DOCUMENTS 5,568,641 A  * 10/1996 Nelson et al. ............... 713/2
5,732,268 A  * 3/1998 Bizzarri ...................... 713/154
5,793,943 A  * 8/1998 Noll ............................ 714/6
6,079,016 A  * 6/2000 Park ........................... 710/10
6,308,265 B1 * 10/2001 Miller ........................ 710/10
6,401,208 B2 * 6/2002 Davis et al. ................ 713/187

FOREIGN PATENT DOCUMENTS

JP          11328040 A  * 11/1999

* cited by examiner

Primary Examiner—Thomas Lee
Assistant Examiner—Paul Yanchus
(74) Attorney, Agent, or Firm—Sheridan Ross P.C.

(57) ABSTRACT

The system architecture of the present invention programs a permanent version of firmware in ROM and employs a validation scheme for downloaded firmware. The downloaded firmware is executed when the validation scheme successfully validates the firmware. In the event that the downloaded firmware fails to download successfully or bring up the system, the processor is able to complete the booting process using the permanent or most recently validated version of firmware.

38 Claims, 3 Drawing Sheets

FIRMWARE DOWNLOAD SCHEME FOR HIGH-AVAILABILITY SYSTEMS

FIELD OF THE INVENTION

The present invention relates generally to an architecture and methodology for downloading firmware and specifically to an architecture and methodology for recovering from an unsuccessful firmware download.

BACKGROUND OF THE INVENTION

To maintain computational systems at peak levels of efficiency, it is common to periodically upgrade software in such systems. A common type of upgrade is to the firmware of the system. "Firmware" is an ordered set of instructions and/or data that is used in booting a computational system. After the firmware instructions or data are coded into ROM, they become part of the hardware (microcode) or a combination of hardware and software (microprograms). An example of firmware is BIOS (Basic Input Output System), which is a set of procedures stored on a ROM chip inside PC-compatible computers.

In normal firmware upgrade operations, new firmware is downloaded into RAM and, if the downloaded new firmware is valid, the new firmware is written into nonvolatile memory such as EPROM, PROM, flash memory, and the like. Typically, old firmware is written over or erased when the new firmware is recorded in nonvolatile memory.

Prolonged system downtime can be caused by malfunctions in the upgrade operation. For example, the new or upgraded firmware can be corrupted or incompatible with the system hardware. Alternatively, the system can go down during writing of new firmware to system memory, thereby causing a loss of both old and new firmware code (known as a "death by download"). For any of these reasons, the new firmware can fail to boot the system.

To correct this problem, the operator typically has no alternative but to redownload the firmware until it brings up the system. The system will thus be out of service until downloading is successful and the new or upgraded firmware successfully runs the system. For example, if a BIOS upgrade fails on a PC, the PC becomes unusable until the BIOS upgrade can be successfully completed and, until a successfully completed BIOS upgrade, the system cannot be used to download another BIOS image such as from a WEB server.

SUMMARY OF THE INVENTION

The method and architecture of the present invention solves these and other problems and represents a significant advancement over the art.

In one embodiment, a method is provided for booting a computational component. The method is particularly useful when a new version of firmware or a firmware upgrade (hereinafter "new" or "first" firmware) is loaded on the computational component which contains an older version of firmware (hereinafter "old" or "second" firmware). As will be appreciated, old firmware can be a permanent version of firmware (such as BIOS recorded on a chip) or an earlier firmware upgrade or firmware replacement recorded in writeable, nonvolatile memory. The method includes the steps of validating the first firmware; executing the first firmware when the first firmware is successfully validated; and executing the second firmware when the first firmware is invalid.

When the first firmware is unsuccessfully validated, the computational component executes the older version of the firmware to ensure availability of the computational component in the event that the first firmware is corrupt, nonexistent or otherwise invalid. An invalidating process can be used to invalidate the first firmware and revert back to the older version of firmware that is known to work. For example, the older version of firmware can be a prior firmware upgrade, modification, or replacement that previously was successfully validated and/or that previously successfully operated the component.

The older version of firmware can be stored in any suitable location. In one configuration, the older version of firmware is permanently stored in ROM as part of or in addition to the boot code. In this configuration, the firmware is not erasable. In another configuration, the older version of firmware is stored in writeable, nonvolatile memory (e.g., flash memory, EPROM or EEPROM) and is erasable.

In one configuration, the validating step is repeated for a predetermined number of attempts. The providing (e.g., loading) step includes the substep of setting at least one of a validation flag to a next state (e.g., "PENDING") and a counter to an initial number (e.g., zero); determining if the validation flag and/or counter has reached a predetermined state (e.g., "PENDING" and/or "three" respectively); and invalidating the firmware when the validation flag has reached the predetermined state (e.g., by setting the validation flag to "INVALID"). Other states for the validation flag include "EMPTY" (meaning that the firmware is being uploaded or downloaded), and "VALID" (meaning that the validation step was successful). As will be appreciated, the validation flag can be any symbol (e.g., alphabetical, numerical, alphanumerical, etc.) denoting a state of the computational component (e.g., the validating process).

In another configuration, the validating step can be preceded by the steps of reading a (boot) code discrete from the firmware (the code typically being recorded in permanent ROM) and determining if new firmware is present. If not, the validation step is not performed.

In another configuration, the validating step includes calculating a checksum of the first firmware and determining if the checksum is valid. As will be appreciated, other validation techniques can be used including Cyclic Redundancy Check ("CRC").

In another embodiment, a computational system containing firmware is provided that includes:
 (a) means for reading a boot code (e.g., a code stored in ROM) of a computational component;
 (b) means for determining, in response to reading of the boot code, if firmware is present in the computational component;
 (c) means for validating the firmware when firmware is present; and
 (d) means for executing the firmware, when the firmware is successfully validated.

In yet another embodiment, a computational system including downloadable firmware is provided that includes:
 (a) a central processor for validating firmware;
 (b) memory containing first and second firmware wherein the second firmware corresponds to the first firmware; and
 (c) a firmware validator for validating the first firmware. The first or new firmware "corresponds" to the second or old firmware in the sense that it upgrades or replaces the old firmware.

The various embodiments represent a significant improvement in system availability. Having a full copy of the firmware in permanent ROM provides much greater system availability than a system having only a boot code in permanent ROM. With only one boot code in ROM, if the new firmware download fails, the system is out of service until the download can be successfully completed. If the new firmware fails to bring up the system, the system will be out of service until the user can procure a second copy of the new firmware for downloading. With the present invention, the system can be brought up to working condition by running either the previously known good firmware version in nonpermanent ROM or in permanent ROM, one or both of which are known to work.

DETAILED DESCRIPTION

Figure 1:
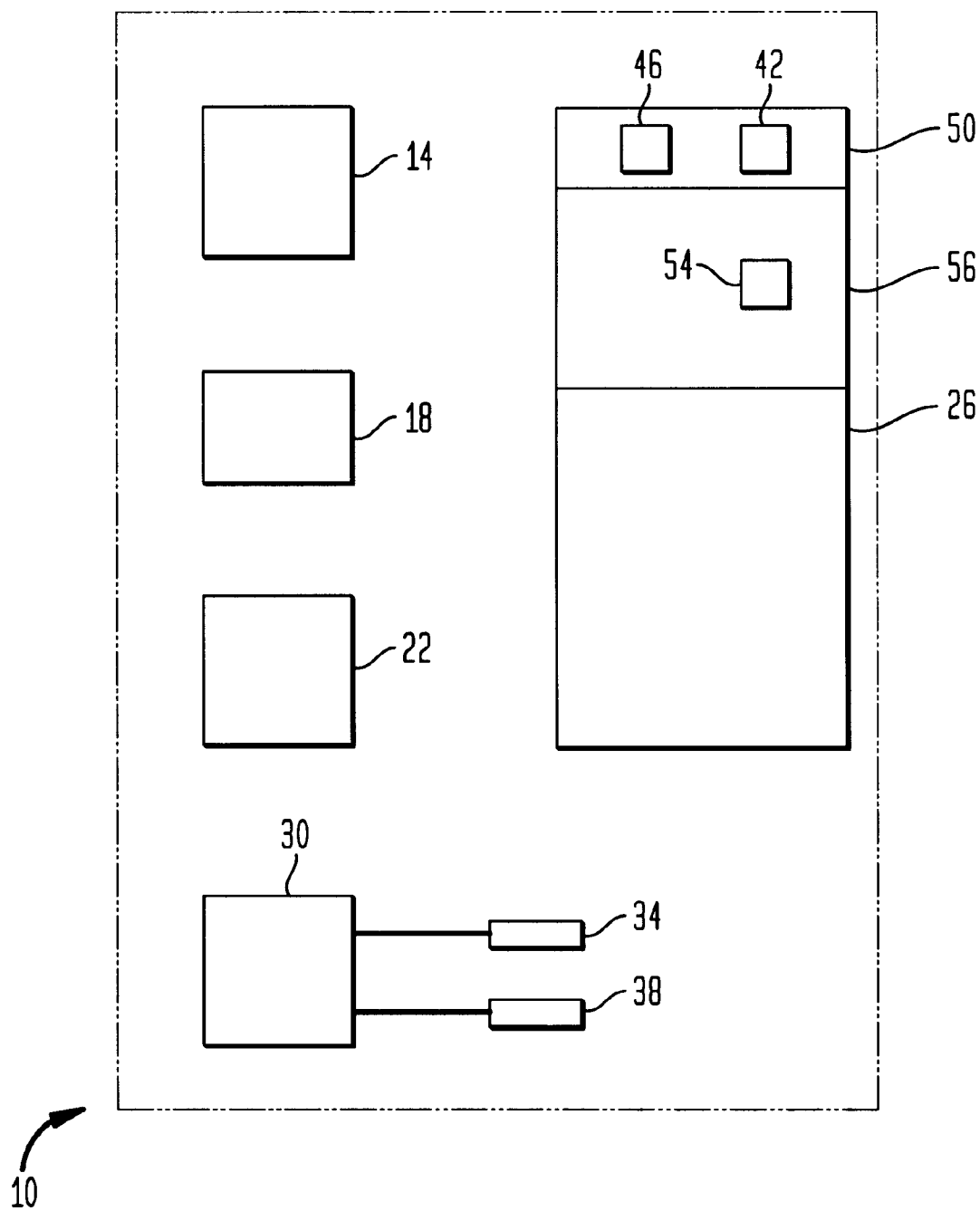
FIG. 1 is a block diagram of a computational component according to one embodiment of the present invention.

Referring to FIG. 1, a computational component 10 according to the present invention is depicted. The computational component includes a central processing unit 14, a timer 18, volatile and nonvolatile memory 22 and 26, respectively, a validator 30, validation flag 34 and a counter 38.

The nonvolatile memory 26 includes a boot code 42 and old firmware 46 stored in permanent (nonwritable) ROM 50 and new firmware 54 stored in nonpermanent ROM 56. The nonvolatile memory 26 can be any long-term storage medium including magnetic, magnetoptical, and optical media. Nonpermanent ROM 56 is writeable. The new firmware 54 is typically stored on writeable, archival media such as EPROM, EEPROM, or Flash PROM.

Figure 2:
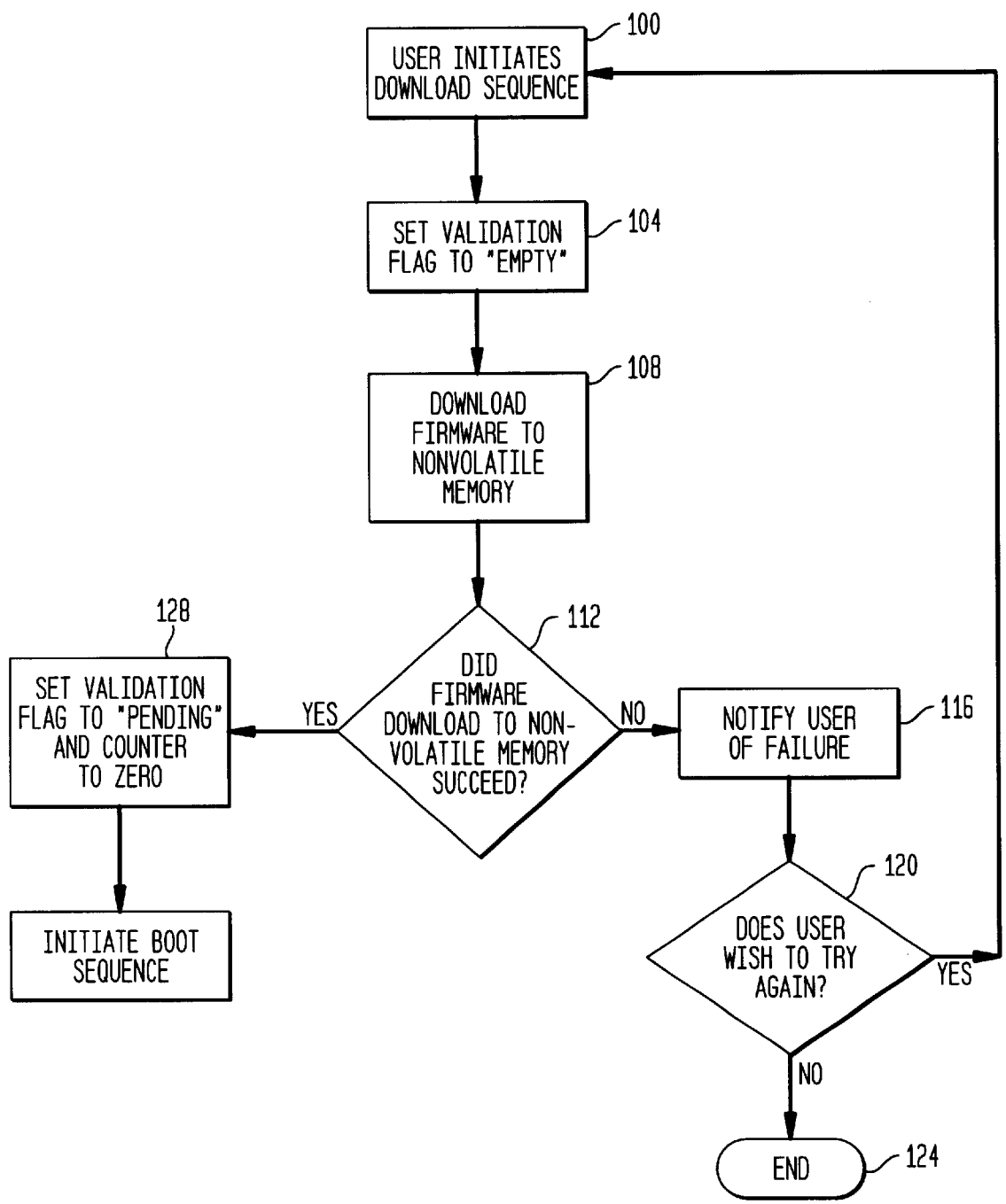
FIG. 2 is a flow schematic of a firmware downloading method according to another embodiment of the present invention.
Figure 3:
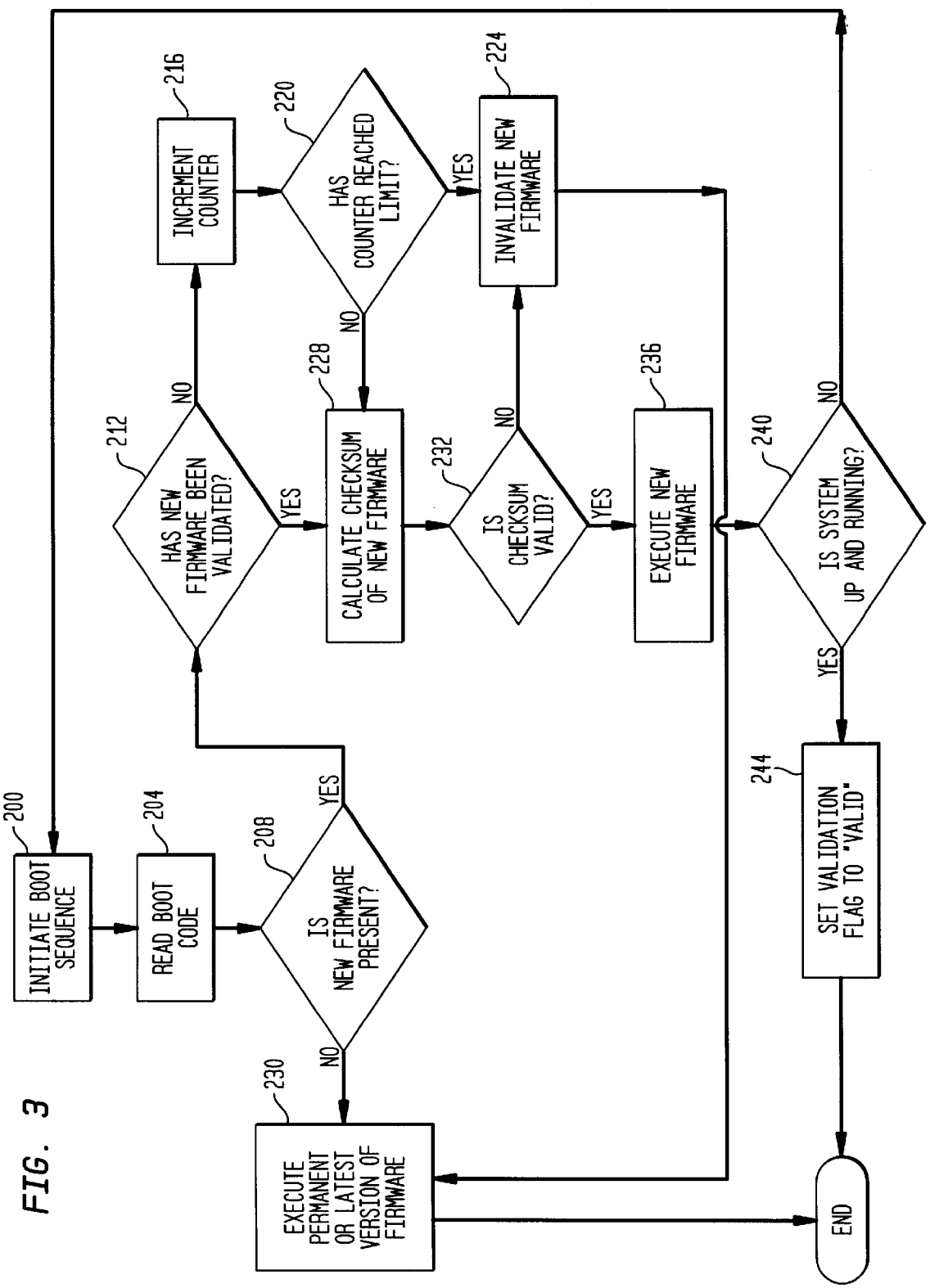
FIG. 3 is a flow schematic of a boot method according to yet another embodiment of the present invention.

The operation of the computational component is depicted in FIGS. 2 and 3. The user initiates 100 the load sequence of new firmware into the nonvolatile memory 26. The new firmware 54 can be loaded from a disk or uploaded or downloaded from another computational component. For example, the new firmware 54 can be downloaded from a WEB server. Although the operation is described with reference to downloading, the new firmware can be loaded by other techniques.

The validation flag 34 is set 104 to "EMPTY" to denote that nonvolatile memory contains no new firmware, and all or a portion of the new firmware 54 is downloaded to nonvolatile memory. As will be appreciated, the new firmware can be first downloaded into RAM 22, verified, and if valid copied into nonvolatile memory. Alternatively, blocks of the new firmware can be sequentially downloaded into RAM 22, verified, and if valid copied into nonvolatile memory. Alternatively, the new firmware can be copied directly to nonvolatile memory and verified.

The processor 14 determines in decision diamond 112 whether the new firmware 54 was successfully downloaded. This determination is typically made by computing a checksum(s) for the firmware and determining if the checksum(s) are valid. The checksum is a number that accompanies data transferred from one place to another to ensure that the data was transmitted correctly. A simple way to compute a checksum is to add up ASCII codes for all of the characters of data in a packet of information and take the result modulo 256. Although this method gives 256 possible checksums, it is very unlikely that a transmission error would change a packet of information into another packet with the same checksum. Accordingly, errors can be detected by transmitting the checksum along with each packet and testing whether the checksum matches the data actually received. Other methodologies for calculating the checksum and determining whether or not it is valid are well known in the art. As will be appreciated, techniques other than the checksum method can be employed to validate the firmware. Examples of such techniques include CRC.

If the new firmware was not successfully downloaded (e.g., a checksum is invalid), the user is notified 116 of a failure. The user next determines 120 whether or not to retry downloading the new firmware 54. If the user decides to retry downloading the new firmware 54, step 100 is repeated. Otherwise, the process is terminated 124.

If the new firmware is downloaded successfully (all checksums were valid), the validation flag 34 is set 128 to a next state "PENDING" and the counter 38 to zero.

Referring to FIG. 3, the boot sequence of FIG. 3 is initiated 200 (i.e., the system is rebooted). During the reboot, the processor 14 reads 204 the permanent boot code 42. As will be appreciated, the boot code 42 directs the processor 14 to read any new firmware as part of the boot sequence, which requires the processor 14 to determine 208 whether any new firmware 54 is present to upgrade or replace the old firmware 46.

If no new firmware is present, the processor 14 reads and executes the old firmware 46 and completes the booting process using the old firmware.

If new firmware is present, the processor 14 determines 212 whether or not the new firmware 54 has been previously validated, such as in the downloading operation described above or in a previous booting operation.

If the firmware has not been validated previously, the processor 14 increments 216 the counter 38. The validation flag 34 indicates whether the validator is pending, successful (valid), or unsuccessful (invalid). The counter 38 determines the number of attempts to validate the new firmware 54.

The processor 14 next determines 220 whether the counter 38 has reached a predetermined limit or threshold. When the counter 38 is the same as the predetermined limit (or the number of unsuccessful validation attempts equals a predetermined number), the new firmware 54 is invalidated 224 and the validation flag is set to "INVALID". The processor 14 next reads and executes 230 the old (or latest) version of firmware. If the counter 38 is less than the predetermined threshold, the processor 14 continues to box 228, which is discussed in detail below.

Returning to decision diamond 212 if the firmware 54 has been validated previously, the processor 14 calculates 228 the checksum of the new firmware 54 and thereafter determines 232 whether the checksum is valid. This is done in the event that one or more bits of the firmware 54 have been lost or corrupted since the previous validation determination.

If the checksum is invalid (or the firmware is invalid), the processor invalidates 224 the new firmware 54 and reads and executes 230 the old (or latest) version of firmware to complete the boot operation.

If the checksum is valid, the new firmware 54 is executed 236 and, after executing the new firmware, the processor 14 determines 240 whether the system is up and running. As will be appreciated, the criterion for determining whether the system is up and running depends on the particular system architecture.

If the system is up and running, the validation flag is set 244 to the "VALID" state, and the boot operation is completed using the new firmware 54.

If the system is not up and running within a specified time interval (e.g., 60 seconds), the processor 14 reinitiates 200 the boot sequence.

The various validation flag and counter settings in the process described above are demonstrated below. The validation flag and counter settings for a successful downloading and validation sequence are as follows:

| ACTION | VALIDATION FLAG | COUNTER |
| --- | --- | --- |
| Begin Download | EMPTY | N/A |
| Download | PENDING | 0 |
| Reboot | PENDING | 1 |
| System Up | VALID | N/A |

This table assumes that only one attempt (the first) is required to execute the new firmware 54.

The validation flag and counter settings for a predetermined maximum of three attempts are as follows:

| ACTION | VALIDATION FLAG | COUNTER |
| --- | --- | --- |
| Begin Download | EMPTY | N/A |
| Complete Download | PENDING | 0 |
| Reboot | PENDING | 1 |
| System Not Up | PENDING | 1 |
| Reboot | PENDING | 2 |
| System Not Up | PENDING | 2 |
| Reboot | PENDING | 3 |
| Validation Retry Limit Reached | INVALID | N/A |

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. By way of example, the validation flag could be a combination of a state flag and the counter. In that event, the validation flag would have the settings 'PENDING X", where X is the number of validation attempts, "VALID" and "INVALID." The symbol for each state can be changed at the user's discretion. For example, the valid state could be renamed the "VALIDATION SUCCESS" state, the pending state "VALIDATION PENDING" state, and the invalid state the "VALIDATION FAILURE" state. The number of attempts before the firmware is invalidated can be more or less than three. The old firmware can include the boot code or be separate from the boot code. The old firmware can be firmware programmed into ROM at the factory or a prior (latest) valid (executable) version of firmware written into nonvolatile memory by a user. In the event that the new firmware is not executable, the processor would be directed by the boot code to execute the latest valid version of the firmware in non-volatile memory in preference to executing a permanent version of the firmware programmed at the factory. Accordingly, the computational component can include more than two versions of the firmware at any one time. The embodiments described herein above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for booting a computational component, comprising:
    (a) providing second firmware in a computational component;
    (b) copying first firmware to a selected location in memory of the computational component;
    (c) validating at least some of the first firmware;
    (d) thereafter executing boot code in the computational component;
    (e) validating the least some of the first firmware;
    (f) executing the first firmware when the at least some of the first firmware is successfully validated; and
    (g) executing the second firmware when the at least some of the first firmware is not successfully validated.

2. A computer readable medium comprising instructions to perform the steps of claim 1.

3. The method of claim 1, wherein the validation steps (c) and (e) are performed using at least one of a redundancy check and a check sum.

4. The method of claim 1, wherein the first firmware is stored in read-only-memory.

5. The method of claim 1, wherein step (c) comprises:
    when the at least a portion of the copied first firmware is validated successfully, setting a validation flag to a first state and a counter to a starting value and performing step (d); and
    when the at least a portion of the first firmware is not validated successfully, not performing step (d).

6. The method of claim 5, further comprising, before the copying step,
    (h) setting the validation flag to a second state, the second state being different from the first state.

7. The method of claim 6, wherein step (g) comprises setting the validation flag to a third state different from the first and second states.

8. The method of claim 7, wherein step (f) comprises setting the validation state to a fourth state different from the first, second, and third states.

9. The method of claim 1, further comprising after step (d):
    (h) determining whether first firmware is present in the memory of the computational component.

10. The method of claim 1, further comprising after step (d) and before step (e):
    (h) determining whether the first firmware has been previously validated successfully in step (e);
    (i) when the first firmware has not been previously validated successfully in step (e), incrementing a counter and determining whether the counter has reached a selected value; and
    (j) when the first firmware has been previously validated successfully in step (e) or when the counter has not reached the selected value, performing step (e).

11. The method of claim 10, wherein, when the first firmware has not been previously validated successfully in step (e) and when the counter has reached the selected value, setting a validation flag to a state indicative of invalidity of the first firmware.

12. The method of claim 9, wherein in determining step (h) the determination of whether first firmware is present is based upon reading a code.

13. A method for booting a computational component, comprising:
    (a) providing second firmware in a computational component;
    (b) reading boot code in the computational component;
    (c) thereafter determining whether first firmware is present in the computational component;
    (d) when first firmware is present, validating at least some of the first firmware; and
    (e) when the first firmware is not present, executing the second firmware.

14. The method of claim 13, further comprising when the first firmware is present the steps of:
    (f) executing the first firmware when the first firmware is successfully validated; and
    (g) executing the second firmware when the first firmware is not successfully validated.

15. The method of claim 14, further comprising:
    (h) copying first firmware to a selected location in memory of the computational component;
    (i) validating at least some of the copied first firmware.

16. A computer readable medium comprising instructions to perform the steps of claim 13.

17. The method of claim 13, wherein the validation step (d) is performed using at least one of a redundancy check and a check sum.

18. The method of claim 13, wherein the first firmware is stored in read-only-memory.

19. The method of claim 15, wherein step (i) comprises:
    when the at least a portion of the copied first firmware is validated successfully, setting a validation flag to a first state and a counter to a starting value and performing step (d); and
    when the at least a portion of the first firmware is not validated successfully, not performing step (d).

20. The method of claim 19, further comprising, before the copying step,
    (j) setting the validation flag to a second state, the second state being different from the first state.

21. The method of claim 20, wherein step (f) comprises setting the validation flag to a third state different from the first and second states.

22. The method of claim 21, wherein step (g) comprises setting the validation state to a fourth state different from the first, second, and third states.

23. The method of claim 13, further comprising after step (c) and before step (d):
    (f) determining whether the first firmware has been previously validated successfully in step (d);
    (g) when the first firmware has not been previously validated successfully in step (d), incrementing a counter and determining whether the counter has reached a selected value; and
    (h) when the first firmware has been previously validated successfully in step (d) or when the counter has not reached the selected value, performing step (d).

24. The method of claim 23, wherein, when the first firmware has not been previously validated successfully in step (d) and when the counter has reached the selected value, setting a validation flag to a state indicative of invalidity of the first firmware.

25. The method of claim 13, wherein in determining step (c) the determination of whether first firmware is present is based upon reading a code.

26. A system for updating firmware, comprising:
    (a) second firmware in a computational component;
    (b) a processor operable to:
        (i) copy first firmware to a selected location in memory of the computational component;
        (ii) validate at least some of the copied first firmware;
        (iii) thereafter execute boot code in the computational component;
        (iv) validate the least some of the first firmware;
        (v) execute the first firmware when the at least some of the first firmware is successfully validated; and
        (vi) execute the second firmware when the at least some of the first firmware is not successfully validated.

27. The system of claim 26, wherein validation is performed using at least one of a redundancy check and a check sum.

28. The system of claim 26, wherein the first firmware is stored in read-only-memory.

29. The system of claim 26, wherein the processor is further operable to:
    (vii) when the at least a portion of the copied first firmware is validated successfully, set a validation flag to a first state and a counter to a starting value and perform validation operation (iv); and
    (viii) when the at least a portion of the copied first firmware is not validated successfully, not perform validation operation (iv).

30. The system of claim 29, wherein the processor is further operable to:
    (ix) set the validation flag to a second state, the second state being different from the first state.

31. The system of claim 26, wherein the processor is operable to set a validation flag to first, second, third, and fourth states, the first, second, third, and fourth states being different from one another.

32. The system of claim 26, wherein the processor is further operable to:
    (vii) determine whether first firmware is present in the memory of the computational component.

33. A system for updating firmware in a computational component, comprising:
    (a) second firmware in a computational component; and
    (b) a processor operable to:
        (i) read boot code in the computational component;
        (ii) thereafter determine whether first firmware is present in the computational component;
        (iii) when first firmware is present, validate at least some of the first firmware; and
        (iv) when the first firmware is not present, execute the second firmware.

34. The system of claim 33, wherein, when the first firmware is present, the processor is further operable to:
    (v) execute the first firmware when the first firmware is successfully validated; and
    (vi) execute the second firmware when the first firmware is not successfully validated.

35. The system of claim 34, wherein the processor is further operable to:
- (vii) copy the first firmware to a selected location in memory of the computational component;
- (viii) validate at least some of the copied first firmware.

36. The system of claim 34, wherein validation is performed using at least one of a redundancy check and a check sum.

37. The system of claim 33, wherein the first firmware is stored in read-only-memory.

38. The system of claim 33, wherein the processor is further operable to set a validation flag to first, second, third, and fourth states, with the first, second, third, and fourth states being different from one another.

* * * * *